United States Patent
Amidon et al.

(10) Patent No.: US 9,098,577 B1
(45) Date of Patent: Aug. 4, 2015

(54) SYSTEM AND METHOD FOR CREATING COLLABORATIVE CONTENT TRACKS FOR MEDIA CONTENT

(75) Inventors: Christopher M. Amidon, Apex, NC (US); Alfredo C. Issa, Apex, NC (US); Richard J. Walsh, Raleigh, NC (US); Gary Black, Cary, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 2845 days.

(21) Appl. No.: 11/395,386

(22) Filed: Mar. 31, 2006

(51) Int. Cl.
*G06F 17/00* (2006.01)
*G06F 17/30* (2006.01)

(52) U.S. Cl.
CPC .... *G06F 17/30781* (2013.01); *G06F 17/30846* (2013.01)

(58) Field of Classification Search
CPC .................. G06F 17/30781; G06F 17/30846
USPC .................. 715/201, 203, 733, 751, 756
See application file for complete search history.

(56) References Cited

U.S. PATENT DOCUMENTS

| | | | |
|---|---|---|---|
| 5,790,426 A | 8/1998 | Robinson | |
| 5,809,493 A | 9/1998 | Ahamed et al. | |
| 5,945,988 A | 8/1999 | Williams et al. | |
| 6,014,638 A * | 1/2000 | Burge et al. | 705/27 |
| 6,064,980 A | 5/2000 | Jacobi et al. | |
| 6,266,649 B1 | 7/2001 | Linden et al. | |
| 6,392,664 B1 | 5/2002 | White et al. | |
| 6,426,778 B1 | 7/2002 | Valdez, Jr. | |
| 6,438,579 B1 * | 8/2002 | Hosken | 709/203 |
| 6,448,980 B1 * | 9/2002 | Kumar et al. | 715/745 |
| 6,530,083 B1 | 3/2003 | Liebenow | |
| 6,538,668 B1 | 3/2003 | Ruberg et al. | |
| 6,595,781 B2 * | 7/2003 | Sutton | 434/276 |
| 6,601,103 B1 | 7/2003 | Goldschmidt Iki et al. | |
| 6,618,714 B1 | 9/2003 | Abrahams | |
| 6,637,032 B1 | 10/2003 | Feinleib | |
| 6,681,357 B2 | 1/2004 | Pendurkar | |
| 6,813,775 B1 | 11/2004 | Finseth et al. | |
| 6,832,388 B1 | 12/2004 | Du Val | |

(Continued)

FOREIGN PATENT DOCUMENTS

WO    WO 01/24524 A1    4/2001

OTHER PUBLICATIONS

Atterer, Richard, et al., "Knowing the User's Every Move—User Activity Tracking for Website Usability Evaluation and Implicit Interaction", May 23-26, 2006, pp. 203-212.*

(Continued)

*Primary Examiner* — Chau Nguyen
(74) *Attorney, Agent, or Firm* — Withrow & Terranova, PLLC

(57) ABSTRACT

A system and method are provided for creating collaborative content tracks to be presented to a user concurrently with a media presentation such as a movie, an episode of a television series, a song, or the like. Each time a user selects and plays a media presentation, user events describing actions taken by the user while viewing or listening to the media presentation are collected and provided to a Collaborative Content Track (CCT) server. The user events may include user events occurring on a primary media playback system, user events occurring on associated secondary user devices, or a combination thereof. In this manner, the CCT server obtains user events for each of a number of media presentations. Based on the user events, the CCT server may generate CCTs for any one of the media presentations to be presented to a user concurrently with the media presentation.

30 Claims, 9 Drawing Sheets

(56) References Cited

U.S. PATENT DOCUMENTS

| | | | |
|---|---|---|---|
| 6,889,207 B2 | 5/2005 | Slemmer et al. | |
| 6,952,716 B1 * | 10/2005 | Robb et al. | 709/205 |
| 7,043,464 B2 | 5/2006 | Abrahams | |
| 7,079,176 B1 | 7/2006 | Freeman et al. | |
| 7,412,131 B2 | 8/2008 | Lee et al. | |
| 7,545,868 B2 | 6/2009 | Kennedy et al. | |
| 7,574,693 B1 | 8/2009 | Kemink | |
| 7,650,316 B2 | 1/2010 | Peck et al. | |
| 7,925,723 B1 | 4/2011 | Amidon et al. | |
| 2001/0037376 A1 | 11/2001 | Ullman et al. | |
| 2002/0035600 A1 | 3/2002 | Ullman et al. | |
| 2002/0035601 A1 | 3/2002 | Ullman et al. | |
| 2002/0038344 A1 | 3/2002 | Ullman et al. | |
| 2002/0045987 A1 | 4/2002 | Ohata et al. | |
| 2002/0112247 A1 | 8/2002 | Horner et al. | |
| 2002/0136414 A1 | 9/2002 | Jordan et al. | |
| 2002/0159607 A1 | 10/2002 | Ford et al. | |
| 2002/0194586 A1 | 12/2002 | Gutta et al. | |
| 2003/0007092 A1 * | 1/2003 | Sonner et al. | 348/463 |
| 2003/0018971 A1 * | 1/2003 | McKenna, Jr. | 725/40 |
| 2003/0037333 A1 | 2/2003 | Ghashghai et al. | |
| 2003/0061324 A1 | 3/2003 | Atherton et al. | |
| 2003/0105819 A1 | 6/2003 | Kim et al. | |
| 2003/0122966 A1 | 7/2003 | Markman et al. | |
| 2003/0200186 A1 | 10/2003 | Abrahams | |
| 2004/0003392 A1 | 1/2004 | Trajkovic et al. | |
| 2004/0015241 A1 | 1/2004 | Brown et al. | |
| 2004/0034638 A1 | 2/2004 | Brown et al. | |
| 2004/0044648 A1 | 3/2004 | Anfindsen et al. | |
| 2004/0098754 A1 | 5/2004 | Vella et al. | |
| 2004/0210947 A1 | 10/2004 | Shusman | |
| 2004/0237120 A1 | 11/2004 | Lewin et al. | |
| 2004/0244057 A1 | 12/2004 | Wallace et al. | |
| 2004/0267971 A1 | 12/2004 | Seshadri | |
| 2005/0010637 A1 | 1/2005 | Dempski et al. | |
| 2005/0015815 A1 | 1/2005 | Shoff et al. | |
| 2005/0060741 A1 | 3/2005 | Tsutsui et al. | |
| 2005/0125827 A1 | 6/2005 | Moreau et al. | |
| 2005/0138674 A1 | 6/2005 | Howard et al. | |
| 2005/0166257 A1 | 7/2005 | Feinleib et al. | |
| 2005/0229233 A1 | 10/2005 | Zimmerman et al. | |
| 2005/0262539 A1 | 11/2005 | Barton et al. | |
| 2006/0059141 A1 | 3/2006 | Yonezawa | |
| 2006/0089820 A1 * | 4/2006 | Yu et al. | 702/186 |
| 2006/0117247 A1 | 6/2006 | Fite et al. | |
| 2006/0129942 A1 | 6/2006 | McCary | |
| 2006/0195515 A1 | 8/2006 | Beaupre et al. | |
| 2007/0156285 A1 | 7/2007 | Sillman et al. | |
| 2007/0214427 A1 | 9/2007 | Peck et al. | |
| 2007/0239695 A1 * | 10/2007 | Chakra et al. | 707/4 |
| 2007/0250844 A1 * | 10/2007 | Collacott | 725/8 |
| 2008/0089302 A1 | 4/2008 | Godfrey et al. | |
| 2008/0126943 A1 * | 5/2008 | Parasnis et al. | 715/730 |
| 2008/0133551 A1 * | 6/2008 | Wensley et al. | 707/100 |
| 2008/0133736 A1 * | 6/2008 | Wensley et al. | 709/224 |
| 2008/0177779 A1 * | 7/2008 | Cancel et al. | 707/102 |
| 2008/0184301 A1 * | 7/2008 | Boylan et al. | 725/40 |
| 2008/0189744 A1 * | 8/2008 | Schein et al. | 725/40 |
| 2008/0301666 A1 | 12/2008 | Gordon et al. | |
| 2010/0169910 A1 * | 7/2010 | Collins et al. | 725/14 |

OTHER PUBLICATIONS

R. Y. Fu et al., "A framework for device capability on demand and virtual device user experience," (article), Sep./Nov. 2004, vol. 48, No. 5/6, pp. 635-648, IBM Journal of Research and Development, http://www.research.ibm.com/journal/rd/485/fu.html.

* cited by examiner

MEDIA FILE: STAR TREK  WEB TRACK: STAR TREK—JOE SMITH
USER: JOE SMITH

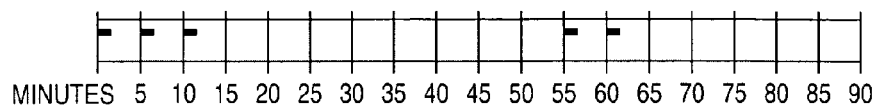

URL EVENTS          SITE 1: 00:25                    SITE 4: 55:04
 - SITE 1: 00:25       SITE 2: 05:10                 SITE 5: 60:02
 - SITE 2: 05:10
 - SITE 3: 10:15          SITE 3: 10:15
 - SITE 4: 55:04
 - SITE 5: 60:02

FIG. 6

MEDIA FILE: STAR TREK  WEB TRACK: STAR TREK—(MOST POPULAR, 5 MINUTES, 20 HITS)
CRITERIA: MOST POPULAR
TIME SLICE: 5 MINUTES
THRESHOLD: 20 HITS

URL EVENTS      MINUTES  5  10  15  20  25  30  35  40  45  50  55  60  65  70  75  80  85  90
 0:00 – 0:05            SITE 1  SITE 4  SITE 5
  - SITE 1              SITE 2          SITE 6       ...       ...       ...       ...
  - SITE 2              SITE 3          SITE 7
  - SITE 3

0:11 – 0:15
  - SITE 4

0:16 – 0:20
  - SITE 5
  - SITE 6
  - SITE 7
   ⋮

FIG. 7

WEB TRACK: STAR TREK—(MOST POPULAR, 5 MINUTES, 20 HITS)

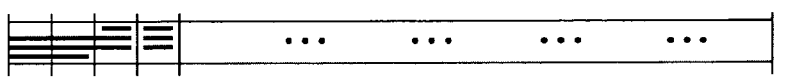

MINUTES  5  10  15  20  25  30  35  40  45  50  55  60  65  70  75  80  85  90

SITE 1  SITE 4  SITE 5
         SITE 2          SITE 6    ...       ...       ...       ...
         SITE 3          SITE 7

FIG. 8

SYSTEM AND METHOD FOR CREATING COLLABORATIVE CONTENT TRACKS FOR MEDIA CONTENT

FIELD OF THE INVENTION

The present invention relates to generating collaborative content to be presented to a user concurrently with a primary media presentation.

BACKGROUND OF THE INVENTION

Advances in technology over the past decade have resulted in an evolution of the traditional movie or television viewing experience into a "media multitasking" experience. Rather than simply sitting in front of a television with their eyes fixed on the screen, viewers may be surfing the web, engaging in an online chat session with friends, or checking their email using nearby devices while viewing the media presentation. These user actions may be related to the media presentation, and, as such, may be of interest to other users who thereafter view the same media presentation. Thus, there remains a need for a system and method for collecting information describing user actions taken while viewing or listening to a media presentation, such as a movie, television program, or a song, and presenting this information to users who thereafter view or listen to the same media presentation.

SUMMARY OF THE INVENTION

The present invention provides a system and method for creating collaborative content tracks to be presented to a user concurrently with a primary media presentation such as a movie, an episode of a television series, or the like. More specifically, each time a user selects and plays a media presentation, user events describing actions taken by the user while viewing or listening to the primary media presentation are collected and provided to a Collaborative Content Track (CCT) server. The user events may include those occurring on a primary media playback system, associated secondary user devices, or a combination thereof. In this manner, the CCT server obtains user events for each of a number of media presentations. Based on the user events, the CCT server may generate one or more CCTs for any one of the media presentations. During subsequent playback of a media presentation, one or more of corresponding CCTs generated by the CCT server are presented to a user concurrently with the media presentation.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 6 illustrates a first exemplary CCT generated by the CCT server of FIG. 1 according to one embodiment of the present invention;

FIG. 7 illustrates a second exemplary CCT generated by the CCT server of FIG. 1 according to one embodiment of the present invention;

FIG. 8 illustrates a third exemplary CCT generated by the CCT server of FIG. 1 according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a system and method for creating collaborative content tracks to be presented to a user concurrently with a primary media presentation such as a movie, an episode of a television series, a song, or the like. More specifically, each time a user selects and plays a media presentation, user events describing actions taken by the user while viewing or listening to the primary media presentation are collected and provided to a Collaborative Content Track (CCT) server. The user events may include user events occurring on a primary media playback system, user events occurring on associated secondary user devices, or a combination thereof. In this manner, the CCT server obtains user events for each of a number of media presentations. Based on the user events, the CCT server may generate one or more CCTs for any one of the media presentations. During subsequent playback of a media presentation, one or more of corresponding CCTs generated by the CCT server are presented to a user concurrently with the media presentation.

As an example, over a period of time, thousands of users may watch the movie Star Trek and have their user events collected and provided to the CCT server. Some users may choose to record all possible events while others may choose to record only some of the possible events. The user events may include, but are not limited to, accessing web pages; sending or receiving instant messages or chat session messages; sending or receiving email; and viewing or listening to other media files such as videos, songs, or images during playback of Star Trek. Periodically, or upon request, the CCT server examines all user events from all users recorded for Star Trek and creates one or more CCTs for Star Trek. The CCTs may include an "Internet—Browsing Track" containing the top three Uniform Resource Locators (URLs) visited during playback for each thirty second time slice of the movie. Thereafter, one or more of the CCTs may be presented to a user while watching the movie Star Trek. The CCTs may be presented to the user via his or her primary media playback system on which the movie is playing, via one or more secondary devices associated with the user, or a combination thereof.

Figure 1:
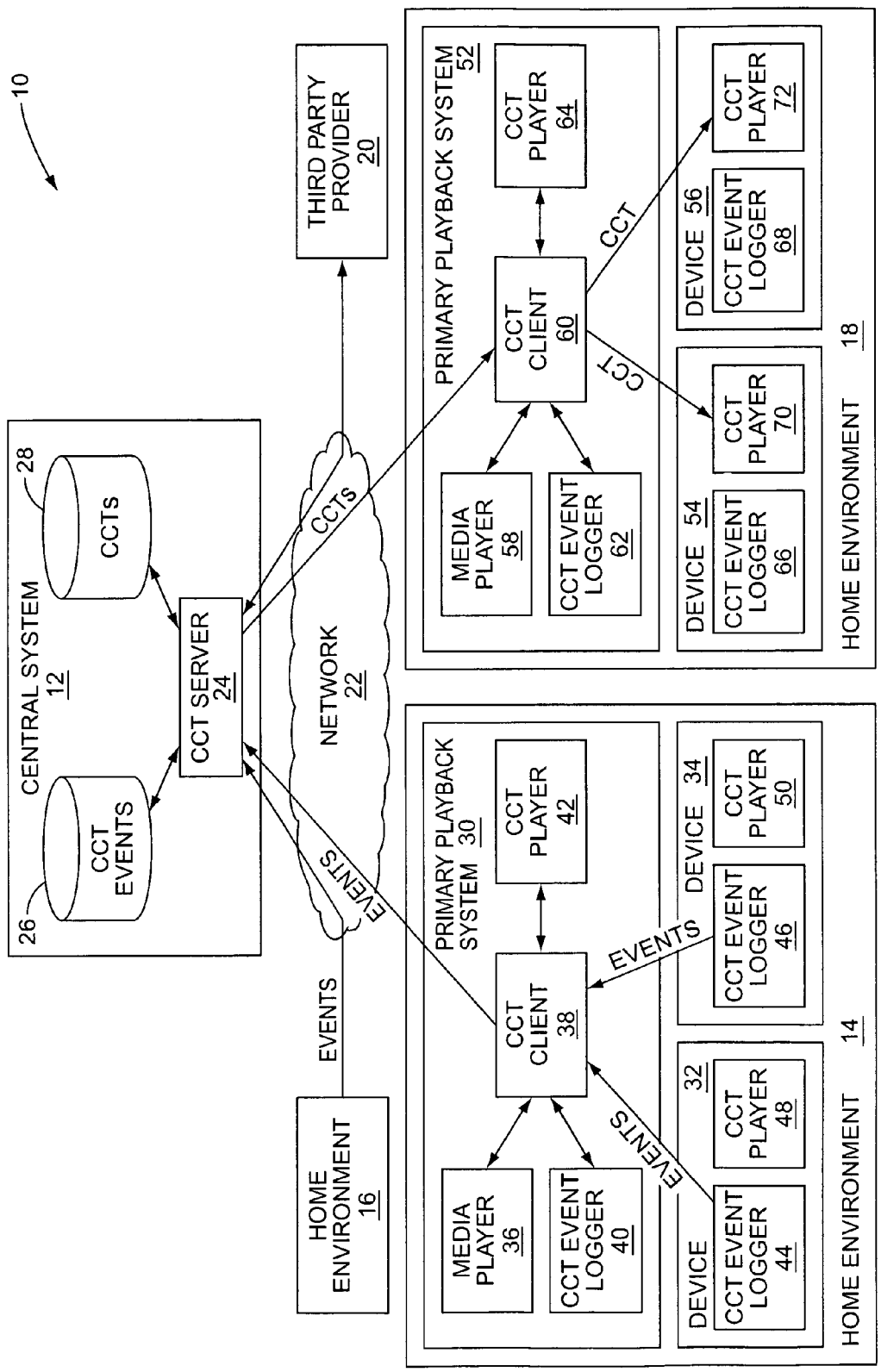
FIG. 1 illustrates a system for generating Collaborative Content Tracks (CCTs) according to one embodiment of the present invention.

FIG. 1 illustrates a system 10 for generating CCTs according to one embodiment of the present invention. In general, the system 10 includes a central system 12, home environments 14-18, and an optional third party provider 20 interconnected by a network 22, which is preferably the Internet. As illustrated, the central system 12 includes a CCT server 24, a CCT events database 26, and a CCT database 28. Although the central system 12 is illustrated as a single block, the central system 12 may be implemented using a number of distributed CCT servers 24 and databases 26 and 28. This may be particularly beneficial when there are a large number of home environments 14-18 within the system 10.

The CCT server 24 may be implemented in hardware, software, or a combination of hardware and software. As discussed below in detail, the CCT server 24 generates one or more CCTs for each of a number of media presentations based on user events received from the home environments 14-18 during playback of the media presentations. A CCT is a playable media file containing media content of any type that is generated by the CCT server 24 based on the user events. In one embodiment, the CCTs are generated according to the Moving Pictures Expert Group's (MPEG's) MPEG-7 standard. When one of the media presentations is played at the home environment 18, the CCT server 24 provides one or more CCTs for the media presentation to the home environment 18 to be presented concurrently with the media presentation. As discussed below, the CCTs may be generated in advance or generated in response to receiving a request for CCTs for a particular media presentation.

The CCT events database 26 and the CCT database 28 may be implemented in a single storage device included within or associated with the CCT server 24. Alternatively, the CCT events database 26 and the CCT database 28 may be implemented on a number of distributed devices. The CCT events database 26 operates to store the user events from each of the home environments 14-18. The user events may include web URLs accessed; instant messages sent or received; email messages sent or received; recording of a program using a Personal Video Recorder (PVR), Digital Video Disc (DVD) recorder, or the like; and watching, viewing, or listening to other media content such as music, images, videos, or the like. The CCT database 28 operates to store one or more CCTs generated by the CCT server 24 and, optionally, CCTs provided by the third party provider 20 for each of a number of media presentations.

The home environment 14 may be a user's home, office, or the like and generally includes a primary playback system 30 and, optionally, a number of secondary devices 32, 34. The discussion herein of the home environment 14 is equally applicable to the home environment 16. The primary playback system 30 may be, for example, a personal computer, a set-top box associated with a cable or satellite television provider, a DVD player, a PVR, or the like. The secondary devices 32, 34 may be, for example, personal computers, laptop computers, mobile telephones, Personal Digital Assistants (PDAs), or the like and are equipped with a wired interface or a local wireless interface such as a Bluetooth, Zigbee, or IEEE 802.11 wireless interface for communicating with the primary playback system 30.

The primary playback system 30 includes a media player 36, a CCT client 38, a CCT event logger 40, and optionally a CCT player 42. Note that while the CCT player 42 is discussed herein for clarity, the media player 36 may alternatively play both the primary media presentation and CCTs such that CCT player 42 is unnecessary. The secondary devices 32, 34 include CCT event loggers 44, 46 and CCT players 48, 50, respectively. Within the primary playback system 30, the media player 36 may be implemented in hardware, software, or a combination of hardware and software and operates to play media content. The CCT client 38 may also be implemented in hardware, software, or a combination of hardware and software and operates to collect, and optionally filter, user events from the CCT event logger 40 for the primary playback system 30 and the CCT event loggers 44, 46 for the secondary devices 32, 34. In addition, the CCT client 38 provides the collected user events to the CCT server 24. During playback of a media presentation having one or more CCTs stored by the central system 12, the CCT client 38 may further operate to obtain CCTs for the media presentation from the CCT server 24 and provide the CCTs to one or more of the CCT players 42, 48, and 50 to be presented to the user concurrently with the media presentation.

The CCT event logger 40 may be implemented in hardware, software, or a combination of hardware and software. The CCT event logger 40 may alternatively be embedded within another application. Further, there may be separate CCT event loggers 40 for each type of event to be tracked. In general, the CCT event logger 40 operates to detect user events and provide the user events to the CCT client 38 during playback of a media presentation.

The CCT player 42 may be implemented in hardware, software, or a combination of hardware and software. Alternatively, the CCT player 42 may be embedded within the media player 36. In operation, the CCT player 42 operates to present one or more CCTs to the user concurrently with the media presentation under the control of the CCT client 38. It should be noted that while only a single CCT player 42 is illustrated, the CCT player 42 may be implemented as a number of CCT players 42, where each of the CCT players 42 is enabled to play one or more of the CCT types. Alternatively, the CCT player 42 may include a number of plug-ins enabling a single CCT player 42 to play each CCT type.

Within the secondary device 32, the CCT event logger 44 operates to track user events occurring on the secondary device 32 during playback of a media presentation on the primary playback system 30 and provide the user events to the CCT client 38. The CCT player 48 is optional and may operate to present one or more CCTs to the user of the secondary device 32 concurrently with playback of a media presentation on the primary playback system 30. Likewise, the CCT event logger 46 of the secondary device 34 operates to track user events occurring on the secondary device 34 during playback of the media presentation on the primary playback system 30, and may also operate to present one or more CCTs to the user of the secondary device 34 concurrently with playback of a media presentation of the primary playback system 30.

The home environment 18 is like the home environments 14 and 16. The details of the home environment 18 are illustrated for ease of discussion of playback of one or more CCTs concurrently with a primary media presentation in the home environment 18. Like the home environments 14 and 16, the home environment 18 includes a primary playback system 52 and secondary devices 54 and 56. The primary playback system 52 includes a media player 58, a CCT client 60, a CCT event logger 62, and optionally a CCT player 64. The secondary devices 54 and 56 include CCT event loggers 66, 68 and CCT players 70, 72, respectively.

The third party provider 20 is optional and may provide additional content tracks, user events, or a combination thereof to the CCT server 24 for media presentations. These CCTs and user events may be provided as a premium service for a fee. The third party provider 20 may be, for example, a broadcaster of television content, a movie production company, or the like.

The exemplary system 10 of FIG. 1 is illustrated such that user events are tracked at the home environments 14 and 16 and provided to the CCT server 24, wherein the CCT server 24 generates one or more CCTs based on the user events and provides the CCTs to the home environment 18 for presentation to the user concurrently with a corresponding media presentation. However, it should be recognized that each of the home environments 14-18 preferably operates to both track user events during playback of media presentations and to present one or more CCTs to the user concurrently with a media presentation when desired.

Figure 2:
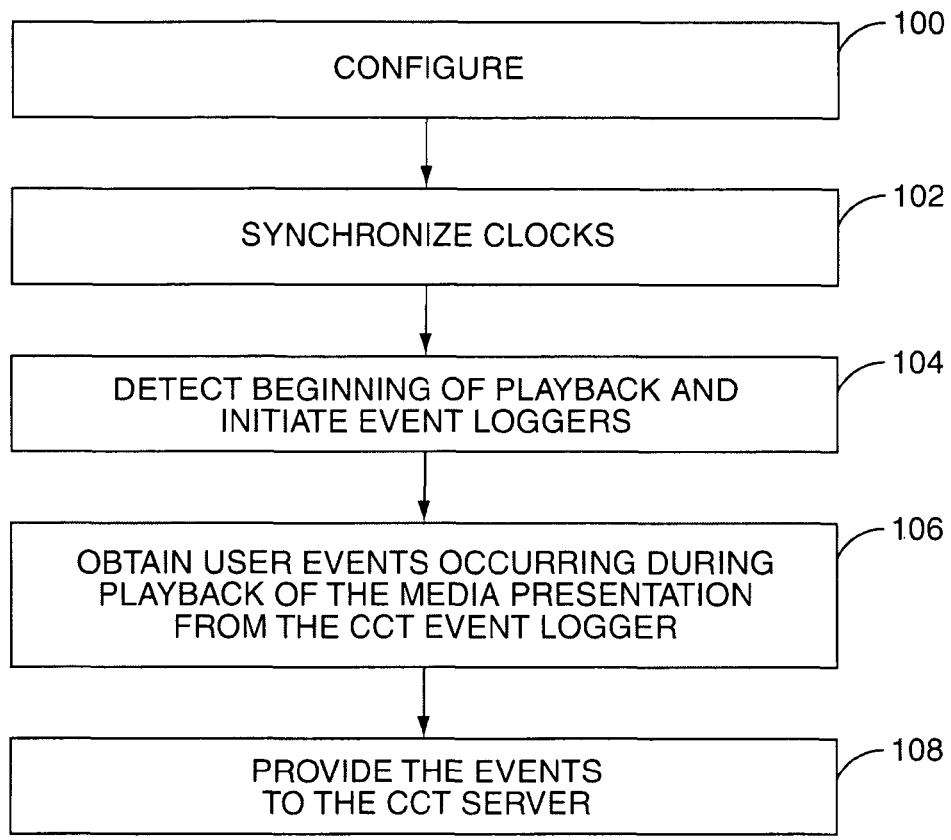
FIG. 2 illustrates the operation of the CCT client of FIG. 1 according to one embodiment of the present invention.

FIG. 2 illustrates the operation of the CCT client 38 according to one embodiment of the present invention. First, the CCT client 38 is configured (step 100). The CCT client 38 may be configured once after initial installation or prior to playback of a media presentation. Configuration begins by first detecting devices within the home environment 14 having CCT event loggers. In this example, the primary playback system 30 and the secondary devices 32, 34 each include the CCT event loggers 40, 44, and 46, respectively, and are therefore detected by the CCT client 38. The user may then select one or more of the primary playback system 30, the secondary device 32, and the secondary device 34 to include in the user event tracking session during playback of an upcoming media presentation or during all future media presentations. For this example, assume that the user selects the primary playback system 30 and the secondary user devices 32, 34. In addition, the user preferably configures the CCT event loggers 40, 44, and 46 in order to define the user events that each CCT event logger 40, 44, and 46 is to track. For example, each of the secondary devices 32 and 34 may include an instant messaging or chat application. The user may configure the CCT event loggers 44 and 46 to collect instant messaging or chat user events on the secondary device 32 but not on the secondary device 34. Note that the user may configure the CCT event loggers 40, 44, and 46 via the CCT client 38 or by interacting with the CCT event loggers 40, 44, and 46. Additionally, the user may modify the configurations of the CCT event loggers 40, 44, and 46 during playback of a media presentation.

Once the CCT client 38 and the CCT event loggers 40, 44, and 46 are configured, the CCT client 38 operates to synchronize clocks used by the CCT event loggers 40, 44, and 46 and the CCT client 38 with a clock used by the media player 36 (step 102). The CCT client 38 may perform this synchronization process prior to playback of a media presentation and, optionally, periodically during playback of the media presentation.

At this point, the CCT client 38 operates to detect the beginning of playback of a media presentation selected by user, and to initiate the CCT event loggers 40, 44, and 46 upon detecting the beginning of playback of the media presentation (step 104). The CCT client 38 then obtains user events from the CCT event loggers 40, 44, and 46 throughout playback of the media presentation (step 106). The CCT event loggers 40, 44, and 46 may automatically provide user events to the CCT client 38 as they occur, periodically in a batch operation, or at the end of playback of the media presentation.

The user events provided by the CCT event loggers 40, 44, and 46 may include information such as, but not limited to, a globally unique event identifier (ID), an event type, a device ID, a user ID, a time stamp, and a value. The event type may be a web URL access event, an instant messaging or chat session send or receive event, an email send or receive event, a recording event, or viewing or listening to another media file event. The device ID may be used to identify the device from which the user event came. The time stamp provides an absolute time and optionally a date at which the user event occurred. The time stamp may be used by the CCT client 38 to determine a time offset of the user event from the beginning of playback of the media presentation. Alternatively, the CCT event loggers 40, 44, and 46, rather than the CCT client 38, may generate the offset from the beginning of the media presentation. The value depends on the event type. If the event type is a web URL, the value may include the URL and genre of the associated webpage or website. If the event type is an instant messaging or chat send or receive event, then the value may include the text or a transcript of the message sent or received. If the event type is an email message send or receive event, then the value may be the email message sent or received or some portion thereof. If the event type is a recording event, the value may be an identifier of the media recorded. If the event type is viewing or listening to another media file, the value may be information describing the media file such as metadata or headers describing the media file. This information will vary depending on the media file type, as will be apparent to one of ordinary skill in the art. However, it will generally include keywords associated with the media file, annotations, a genre, file size, and the like.

After receiving the user events from the CCT event loggers 40, 44, and 46, the CCT client 38 provides the user events to the CCT server 24 (step 108). To ensure complete and accurate transmission, the CCT client 38 may optionally store the user events locally prior to sending the user events to the CCT server 24. The CCT client 38 may provide the user events to the CCT server 24 as they are received from the CCT event loggers 40, 44, and 46, periodically in a batch process, or at the end of playback of the media presentation. In addition, prior to sending the user events to the CCT server 24, the CCT client 38 may process the user events to add additional information and, optionally, to filter the user events. More specifically, the CCT client 38 may process the time stamp for each user event to create a time offset for each user event defining an offset in seconds or minutes between the beginning of the media presentation and the time at which the user event occurred. The CCT client 38 may also add information such as, but not limited to, the user ID and a user profile to the user events. The user profile may include demographic information, user preferences, or the like. The user profile may alternatively be stored by the CCT server 24 in association with the user ID rather than stored as part of the user event. Demographic information may include age, sex, marital status, home address, hobbies, favorite movie or music genre, favorite movie, and the like.

As for filtering, the CCT client 38 may filter the user events based on predetermined criteria and provide only the filtered user events to the CCT server 24. For example, if a user accessed four websites in rapid succession, then the user events for the first three of these four websites may be discarded while the user event for the fourth website is preserved. As discussed below, this filtering process may alternatively be performed by the CCT event loggers 40, 44, and 46. In order to facilitate this filtering process, the CCT server 24 and the CCT client 38 may perform a handshaking operation either periodically or before collecting new events for a recorded media presentation, wherein the CCT server 24 and the CCT client 38 agree on the types of user events that are to be tracked and provided to the CCT server 24. For example, the CCT server 24 may only be interested in events from certain users, from certain devices 30, 32, 34, for certain recorded media presentations, or the like.

Figure 3:
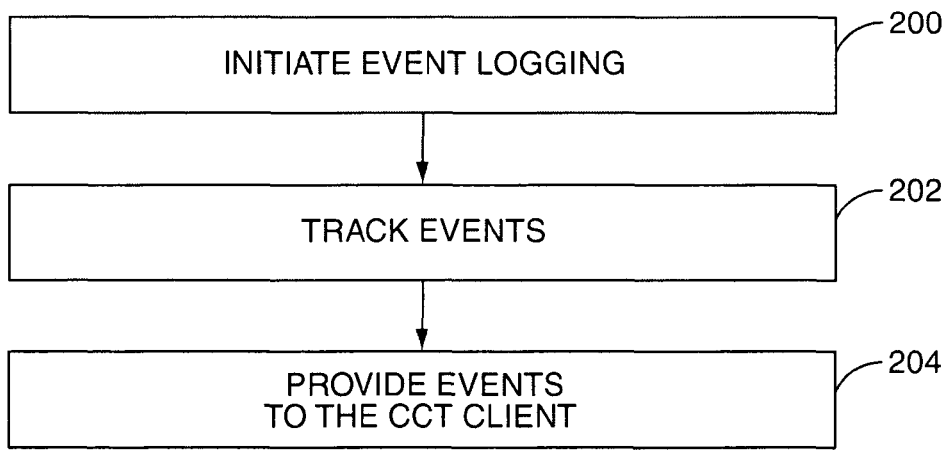
FIG. 3 illustrates the operation of the CCT event logger of FIG. 1 according to one embodiment of the present invention.

FIG. 3 illustrates the operation of the CCT event logger 40. However, this discussion is equally applicable to the CCT event loggers 44 and 46. First, the CCT event logger 40 is initiated by the CCT client 38 (step 200). Note that prior to initiation and, optionally, periodically thereafter, the CCT client 38 may communicate with the CCT event logger 40 in order to synchronize a clock of the CCT event logger 40 with the clock or clocks used by the CCT client 38 and the media player 36.

After the CCT event logger 40 is initiated, user events are tracked (step 202). Tracking the user events may include, for example, detecting when the user requests a webpage, when the user sends or receives an instant message or chat message, when a recording event begins, when a recording event is programmed by the user, when the user sends or receives an email, when the user listens to or views another media file, or the like. Upon detecting a user event, the CCT event logger 40 generates a user event data structure, which is generally referred to herein as the user event. The CCT event logger 40 provides the user events to the CCT client 38 as the user events occur, periodically in a batch process, or at the end of playback of the media presentation (step 204).

In addition, as discussed above, the CCT event logger 40 may filter the user events and provide only the filtered user events to the CCT client 38. For example, if a user accesses four websites in rapid succession, the CCT event logger 40 may filter the user events such that the user events for the first three requests are discarded while the user event for the last request is preserved. In addition, the CCT event logger 40 preferably captures the user events at the desired level of detail. For example, when a user accesses a webpage, numerous Hypertext Transfer Protocol (HTTP) requests may be sent in order to obtain the various components of the webpage, as will be apparent to one of ordinary skill in the art. Since it may not be desirable to generate separate user events for each HTTP request for a single webpage, the CCT event logger 40 preferably operates such that only user initiated requests are recorded as user events.

Figure 4:
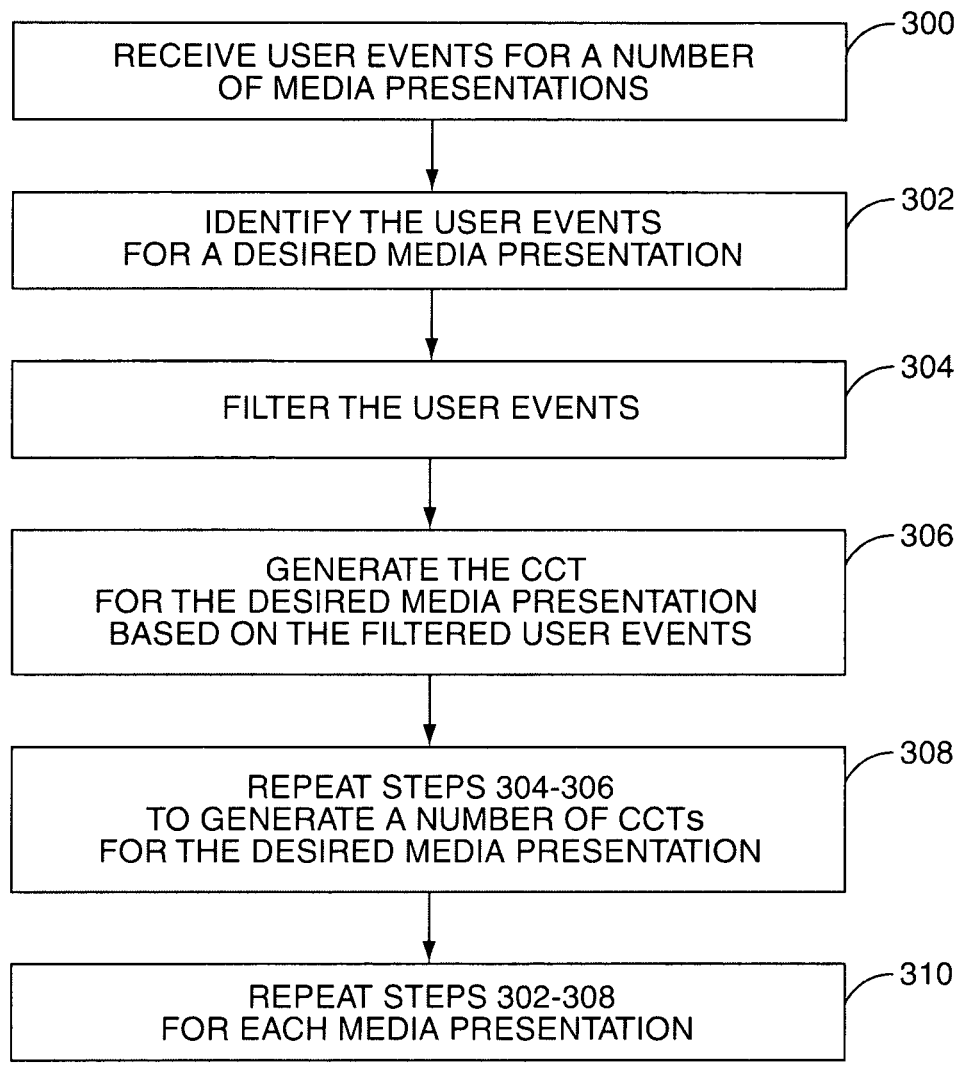
FIG. 4 illustrates the operation of the CCT server of FIG. 1 according to one embodiment of the present invention.

FIG. 4 illustrates the operation of the CCT server 24 according to a first embodiment of the present invention. In this embodiment, the CCT server 24 pre-builds one or more CCTs for a number of media presentations prior to receiving a request for CCTs. First, the CCT server 24 receives user events from a number of CCT clients, such as the CCT client 38, during playback of media presentations (step 300). Next, the CCT server 24 identifies user events for a desired media presentation by, for example, querying the CCT events database 26 (step 302). The CCT server 24 may filter the user events for the desired media presentation based on predetermined criteria for a desired CCT (step 304). It should be noted that steps 302-304 may be implemented as a single query. However, for clarity, steps 302-304 are illustrated as separate steps. The criteria used to filter the user events may include one or more desired event types, one or more ranges of dates, one or more genres, one or more user IDs, demographic information, and the like. For example, the CCT server 24 may filter the user events for the desired media presentation to identify the user events of the web URL event type that occurred within the last thirty days and are of the "sports" genre. Other genres may include news, e-commerce, entertainment, health, and the like. As another example, the CCT server 24 may filter the user events for the desired media presentation to identify the user events from users having desired demographic information, interests, or the like. For example, the CCT server 24 may identify user events from users who enjoy Sci-Fi movies and that are at least 40 years old.

The CCT server 24 then generates the CCT using the filtered user events (step 306). The CCT is then stored in the CCT database 28 such that it is available for future use. As discussed below, the CCT server 24 may use the filtered user events to generate the CCT by first associating the filtered user events with time slices of the media presentations based on the offsets of the user events. The time slices may, for example, correspond to five-minute segments of the media presentation. Then, the CCT may be generated such that, for each time slice, information from the filtered user events for that time slice, or a portion thereof, are presented to the user. If there are many user events for each of the time slices or for some of the time slices, the user events may be selected or arranged within the CCT based on popularity or event rating, which may also be referred to as priority. The event ratings of the user events may be assigned by the user during configuration of the CCT client 38 or assigned by the CCT server 24 based on feedback from users regarding the individual user events or previously viewed CCTs generated based on the user events.

As an example, for web URL events, the CCT may be generated such that the URLs are presented to the user. Further, the URLs may be "clickable" such that the user may select the URL to display the corresponding web content. As another example, for user events identifying music listened to by other users during the particular time slice of the media presentation, the CCT may be generated to provide information describing the music such as artist, album name, title, and the like to the user. Further, the CCT may be generated such that the user may select the music for download and, if desired or required, purchase the music.

It should be noted that the CCT may be generated based on user events of a single user event type or a combination of user event types. The CCT may present information such as URLs of websites accessed and music played during the same CCT and even within the same time slice of the CCT.

At this point, steps 304-306 may be repeated to generate any number of CCTs for the desired media presentation (step 308). Each iteration of steps 304-306 includes different criteria for the filtering process of step 304. Further, the CCT server 24 may generate high, medium, and low density versions of each CCT. A high density version has short time slices and, optionally, information pertaining to a large number of user events within each time slice. A medium density version has a medium length time slice and, optionally, information pertaining to an intermediate number of user events for each time slice. A low density version has a large time slice length and, optionally, information pertaining to a small number of user events for each time slice.

After generating the desired CCTs for the media presentation, the CCT server 24 may then repeat steps 302-308 to generate one or more CCTs for each of a number of media presentations (step 310). As a result, one or more CCTs for each media presentation having corresponding user events are generated and stored in the CCT database 28. As such, when a request for CCTs for one of the media presentations is received by the CCT server 24, the CCT server 24 queries the CCT database 28 to obtain at least a subset of the CCTs for the media presentation and returns the CCTs to the requesting node.

Note that the request received by the CCT server 24 may include criteria in addition to information identifying the media presentation such that only a subset of the CCTs for the media presentation are returned. For example, the request may indicate that only CCTs relating to a "sports" genre or a "comedy" genre are to be provided. As another example, the request may indicate that only CCTs having a user rating above a predetermined threshold are to be provided. The user ratings of the CCTs may be determined by the CCT server 24 based on feedback from users having previously viewed the CCTs, where the feedback may be provided via the CCT client 38. As another example, the request may indicate that only CCTs generated based on user events from users enjoying Sci-Fi movies and that are at least 40 years old are desired.

As yet another example, the request may indicate that only user events having an event rating above a predetermined threshold are to be used. The event ratings may be provided by the CCT server 24 based on feedback regarding CCTs. More specifically, the CCT server 24 may use feedback regarding CCTs to generate user ratings for the user events used to generate the CCTs. Alternatively, the event ratings may be defined by the user as part of the CCT client or CCT event logger configurations. More specifically, the CCT client 38 may be configured such that user events from the secondary device 32 are assigned a higher event rating, or priority, than user events from the secondary device 34.

The CCT server 24 may additionally generate one or more CCTs for each of the media presentations based on combining two or more highest rated CCTs. Thus, for example, the two highest rated CCTs for a particular media presentation may be combined to provide a new CCT. The new CCT may include all of the content or a portion of the content from the two highest rated CCTs.

Figure 5:
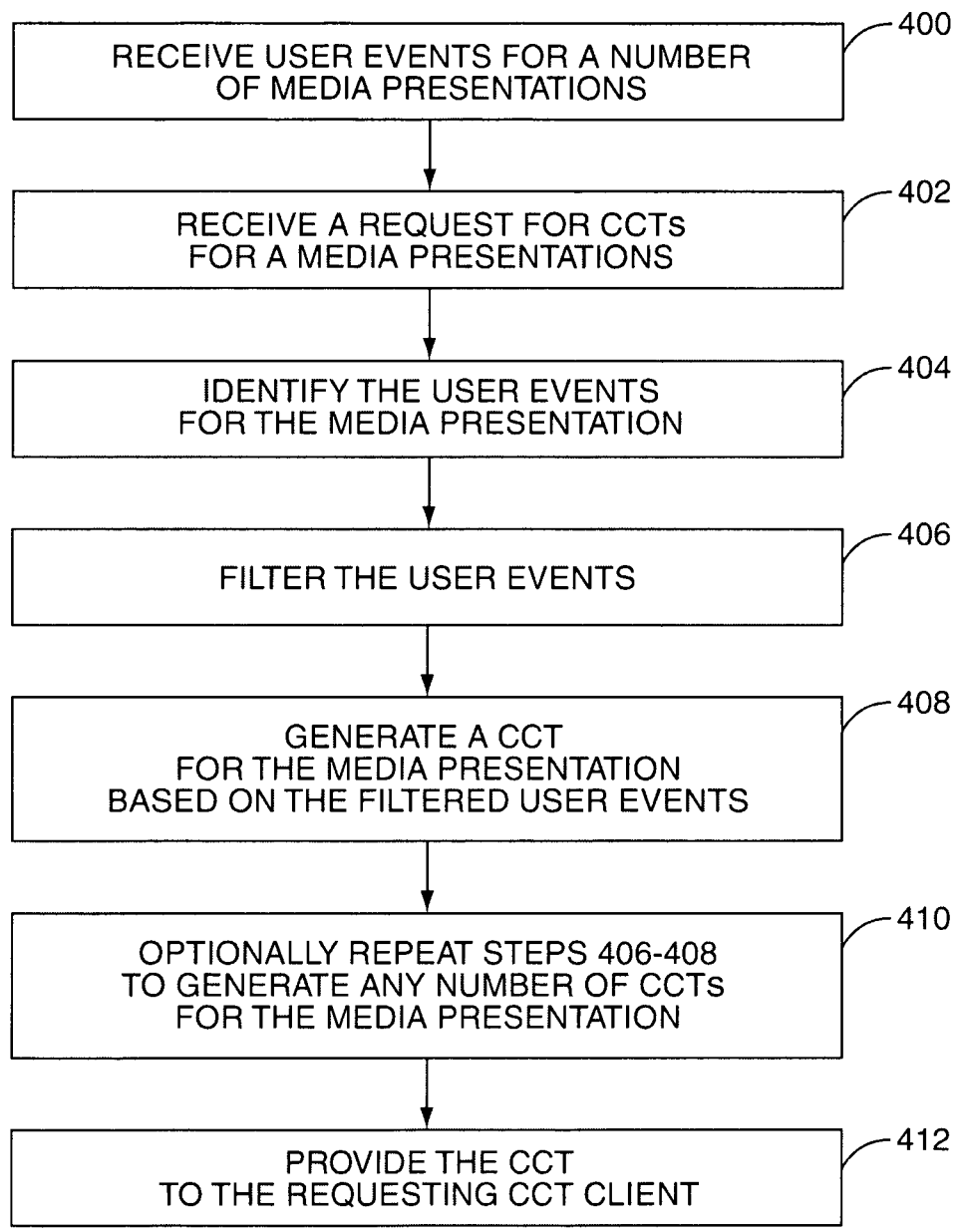
FIG. 5 illustrates the operation of the CCT server of FIG. 1 according to a second embodiment of the present invention.

FIG. 5 illustrates the operation of the CCT server 24 according to a second embodiment of the present invention. In this embodiment, the CCT server 24 operates to generate CCTs dynamically. More specifically, the CCT sever 24 generates one or more desired CCTs after receiving a request for CCTs rather than pre-building the CCTs as described above with respect to FIG. 4. First, the CCT server 24 receives user events from a number of CCT clients, such as the CCT client 38, during playback of media presentations (step 400). At some point in time, the CCT server 24 receives a request from, for example, the CCT client 60 within the home environment 18 (step 402). The request may be generated by the user associated with the CCT client 60 or automatically generated by the CCT client 60. The request may automatically be generated by the CCT client 60 upon detecting the selection of a media presentation for playback or upon detecting the recording of a media presentation. Note that by automatically requesting CCTs upon detecting the recording of the media presentation, the CCT client 60 may obtain the CCTs for the recorded media presentation prior to playback. As a result, the CCTs for the recorded media presentation may be immediately available when playback is desired.

The request from the CCT client 60 includes information identifying a media presentation for which CCTs are desired. In addition, the request may include criteria to be used by the CCT server 24 in filtering the user events for the media presentation in order to generate CCTs for the media presentation. The criteria may include, but is not limited to, one or more desired event types, one or more ranges of dates, one or more genres, one or more user IDs, demographic information, and the like. The criteria may be defined by the user associated with the CCT client 60 or automatically generated by the CCT client 60 based on detected preferences or tendencies of the user. The detected user preferences and tendencies of the user may be identified by the CCT client 60 based on a user history maintained by the CCT client 60 describing past actions taken by the user. These past actions may be, but are not limited to, CCT selection, previous criteria defined by the user for CCT generation, or user events logged by the CCT event loggers 62, 66, and 68.

Next, the CCT server 24 identifies user events for a desired media presentation by, for example, querying the CCT events database 26 (step 404). The CCT server 24 may then filter the user events for the desired media presentation to identify user events for a desired content track type (step 406). In one embodiment, the CCT server 24 filters the user events based on the criteria provided in the request. Additionally or alternatively, the CCT server 24 may filter the user events based on its own criteria, as discussed above with respect to FIG. 4. Note that steps 404-406 may be performed using a single query to the CCT events database 26. However, they are illustrated as separate steps for clarity and ease of understanding.

For example, the CCT server 24 may filter the user events for the desired media presentation to identify the user events of the web URL event type that occurred within the last thirty days and are of the "sports" genre. Other genres may include news, e-commerce, entertainment, health, and the like. As another example, the CCT server 24 may filter the user events for the desired media presentation to identify the user events from users having desired demographic information, interests, or the like. For example, the CCT server 24 may identify user events from users who enjoy Sci-Fi movies and that are at least 40 years old.

The CCT server 24 then generates a CCT for the desired media presentation based on the filtered user events (step 408). The CCT may optionally be stored in the CCT database 28 such that it is available for future use. At this point, steps 406-408 may optionally be repeated to generate any number of CCTs for the desired media presentation (step 410). Each iteration of steps 406-408 includes different criteria for the filtering process of step 406. The criteria for each iteration, or each desired CCT, may be provided in the request. Alternatively, the criteria for each iteration may be provided by selecting different combinations of the criteria provided in the request or by adding additional criteria to the criteria provided in the request. In addition or alternatively, the CCT server 24 may generate high, medium, and low density versions of each CCT. Numerous variations of the types of CCTs that may be generated will be apparent to one of ordinary skill in the art upon reading this disclosure.

After generating the CCTs for the media presentation, the CCT server 24 then provides the CCTs to the CCT client 60 (step 412). Alternatively, information describing the CCTs may be provided to the CCT client 60 and presented to the user such that the user may select one or more of the CCTs to be presented concurrently with the media presentation. As a result, only the desired CCTs rather than all generated CCTs may be downloaded to the CCT client 60.

FIGS. 6-8 illustrate three exemplary CCTs. It should be noted that these examples are not intended to limit the scope of the present invention. FIG. 6 illustrates a CCT generated by the CCT server 24 for the movie Star Trek, wherein the user events were filtered to identify the user events for the movie Star Trek of the web URL event type for the user Joe Smith. Using the filtered user events, the CCT track "Web Track: Star Trek—Joe Smith" was generated by the CCT server 24. As illustrated, the CCT is divided into a number of five minute time slices, wherein the time slices of the CCT track are preferably time aligned or synchronized to the media presentation. Each of the web URL user events falls within one of the time slices. Thus, in this example, the CCT server 24 has generated the CCT such that the CCT displays the web URL for a first website (Site 1) during the first time slice, the web URL for a second website (Site 2) during the second time slice, and the web URL for a third website (Site 3) during the third time slice. The web URL for a fourth website (Site 4) is displayed during the time slice from 55-60 minutes, and a web URL for a fifth website (Site 5) is displayed during the time slice from 60-65 minutes. As illustrated, no user events of the web URL type and for the user Joe Smith occurred during the time slices beginning at 15 minutes and ending at 55 minutes and the time slice beginning at 65 minutes and ending at 90 minutes. As such, in this example, the CCT displays no web URLs during these time slices. However, in another embodiment, the CCT server 24 may automatically adjust durations of the user events such that the user events may last more than one time slice in order to fill gaps in the CCT, as described below in detail.

FIG. 7 illustrates a second exemplary CCT generated by the CCT server 24 for the movie Star Trek, wherein the user events were filtered to identify the three most popular user events for the movie Star Trek of the web URL event type for each five minute time slice of the movie. In order to identify the three most popular user events, the CCT server 24 may first filter the user events for the movie Star Trek to identify the user events of the web URL type. The filtered user events may be divided into groups based on five minute time slices using the time stamps or offsets of the user events. Then, for each time slice, the three most popular web URLs are identified. Using the three most popular web URLs, the CCT server 24 generates the CCT. Thus, as illustrated, three URLs (Site 1, Site 2, Site 3) are displayed during the first time slice of the CCT. During the second time slice, the CCT does not include any web URL since there were no filtered user events occurring during this time slice. During the third time slice, the CCT includes only one web URL (Site 4) because only one filtered user event occurred during this time slice. During the fourth time slice, the CCT displays the three most popular web URLs (Site 5, Site 6, Site 7) for the fourth time slice. The CCT continues in a similar manner until reaching the end of the media presentation.

FIG. 8 illustrates a third exemplary CCT generated by the CCT server 24. This CCT is similar to that illustrated in FIG. 7. However, in this example, the durations of the web URL events are adjusted by the CCT server 24 in order to fill gaps in the CCT. More specifically, referring back to FIG. 7, gaps in the CCT occurred during the second and third time slices. In the second time slice, the CCT included no web URLs; and, in the third time slice, the CCT included only one, rather than three, web URLs. As illustrated in FIG. 8, the CCT server 24 may adjust the durations of the three user events in the first time slice in order to fill the gap in the second time slice, and adjust the duration of the user events then in the second time slice to fill the gap in the third time slice. More specifically, since no filtered user events occur during the second time slice, the CCT server 24 may adjust the duration of the three user events in the first time slice from a one time slice duration to a two time slice duration. As a result, the CCT displays the three most popular web URLs for the first time slice (Site 1, Site 2, Site 3) for both the first and second time slices. Then, since the third time slice includes only one user event, the CCT server 24 may further adjust the durations of the two most popular user events from the second time slice from a two time slice duration to a three time slice duration. As a result, the CCT displays the web URLs (Site 1, Site 2, Site 4) during the third time slice. In a similar fashion, the CCT server 24 operates to generate the CCT for the remaining time slices. The user events having adjusted durations may be referred to herein as dispersed user events.

Figure 9:
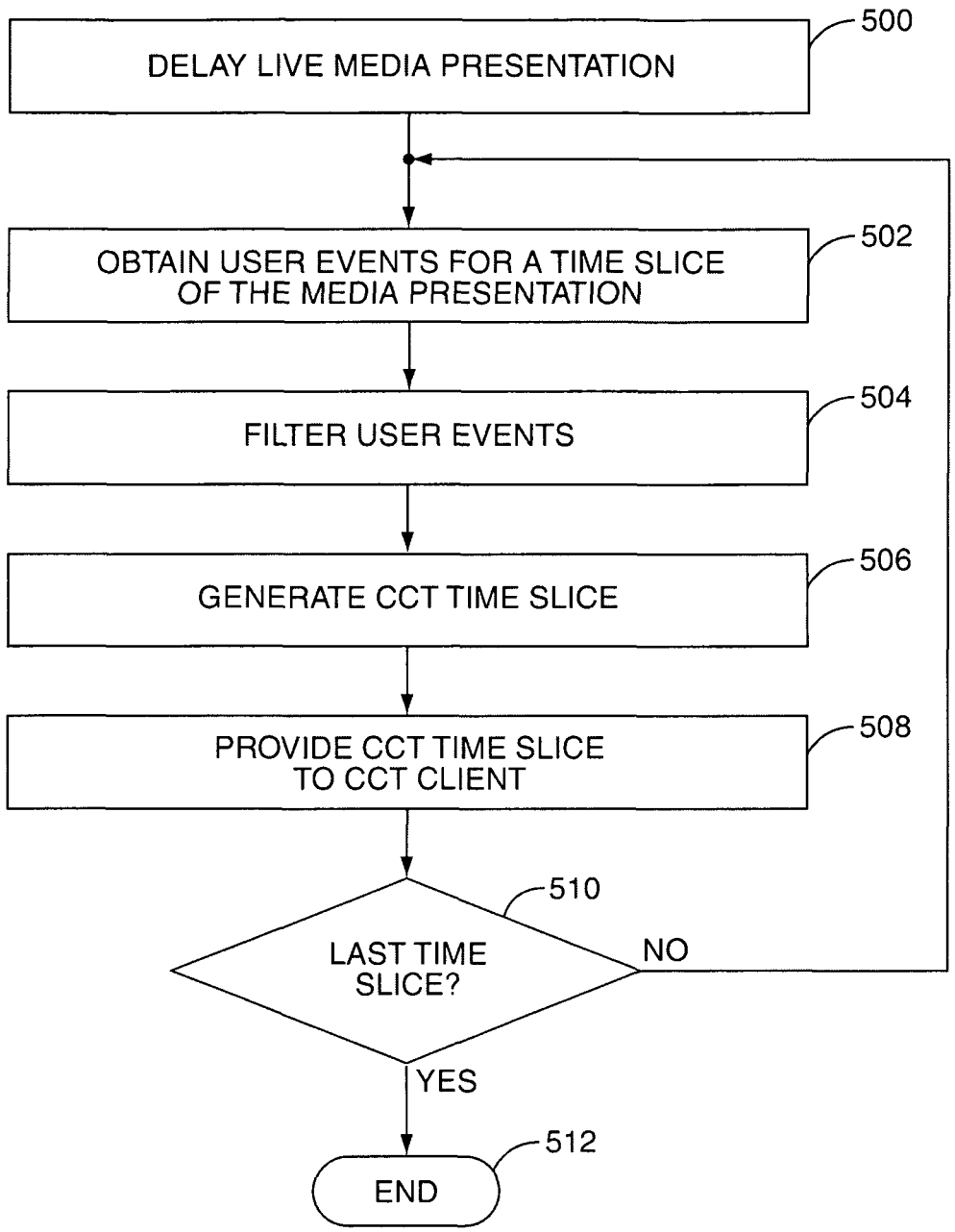
FIG. 9 illustrates the operation of the CCT server of FIG. 1 according to a third embodiment of the present invention.

FIG. 9 illustrates the operation of the CCT server 24 to generate CCTs according to a third embodiment of the present invention. In this embodiment, the CCT server 24 generates CCTs for a "near-live" media presentation. More specifically, by delaying a live media presentation by a number of seconds or at most a few minutes, the CCT server 24 may generate one or more CCTs for the media presentation. First, the live media presentation is delayed (step 500). As stated above, the live media presentation may be delayed by a number of seconds and at most a few minutes. In one embodiment, the live media presentation is delayed by a time substantially equal to a desired time slice duration, which may be, for example, five minutes. The live media presentation may be delayed, for example, by the media player 58 under control of the CCT client 60 while the CCT server 24 generates the CCTs for the live media presentation.

While the media presentation is being delayed, the CCT server 24 obtains user events from other users viewing or listening to the live media presentation in real time for a first time slice of the live media presentation (step 502). The CCT server 24 then filters the user events as described above (step 504). In one embodiment, the CCT server 24 filters the user events based on one or more desired event types, one or more user IDs, demographic information, genres, range of dates, and the like. Using the filtered user events, the CCT server 24 generates a time slice of a CCT for the live media presentation (step 506) and provides the time slice of the CCT to the requesting CCT client, which may be the CCT client 60 (step 508). Although not illustrated, steps 504-508 may be repeated to generate time slices for any number of CCTs for the live media presentation.

Once the first time slice of the CCT is provided to the CCT client 60, the live media presentation begins playing at the home environment 18 while the time slices of the CCT generated by the CCT server 24 for the live media presentation begin to be presented to the user concurrently with the live media presentation. Steps 502-508 are repeated to generate successive time slices of the CCT for the live media presentation until the last time slice of the CCT for the media presentation is generated and provided to the CCT client 60 (steps 510-512). In this manner, the CCT server 24 is enabled to provide one or more CCTs for live, or "near-live," media presentations.

Figure 10:
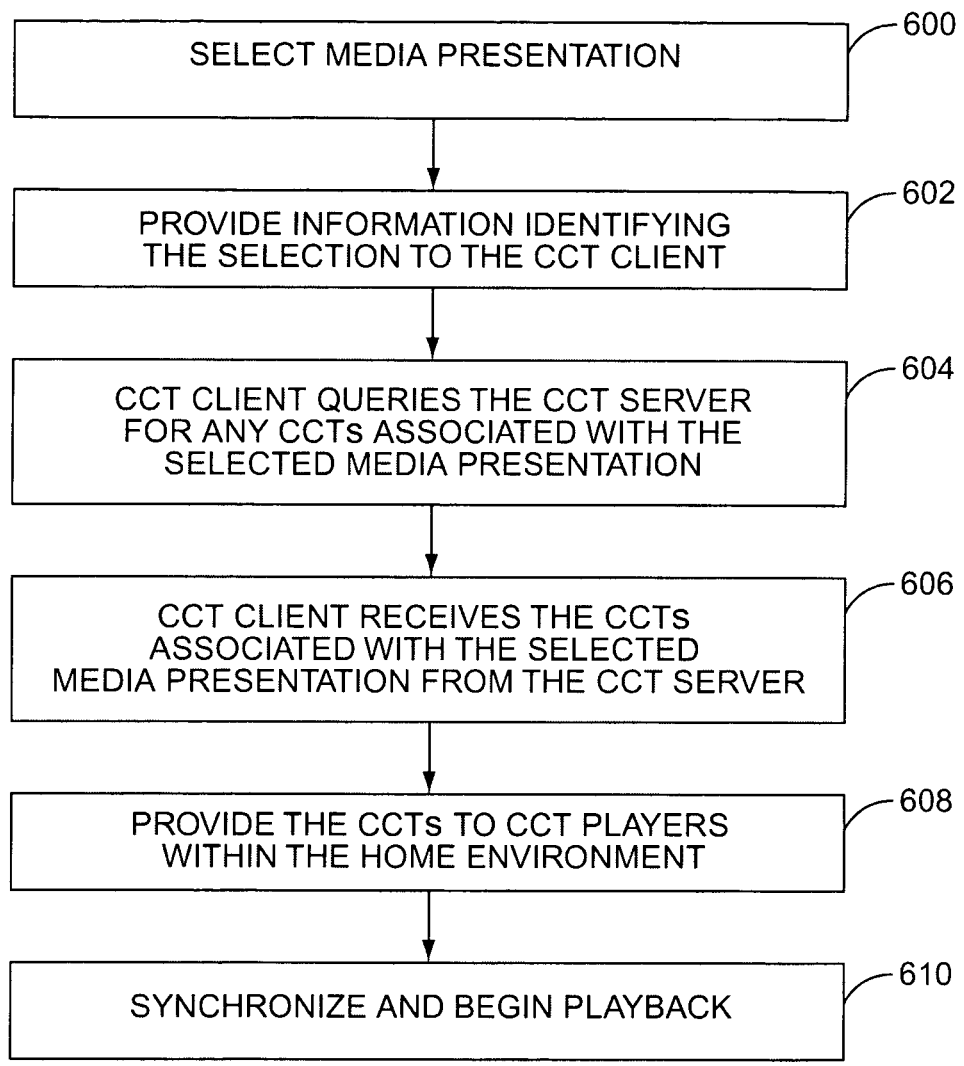
FIG. 10 illustrates the operation of the CCT client during playback of a media presentation and one or more CCTs according to one embodiment of the present invention.

FIG. 10 illustrates the operation of the CCT client 60 according to one embodiment of the present invention. In general, the CCT client 60 operates to obtain one or more CCTs for a media presentation from the CCT server 24 and control playback of the media presentation and the one or more of the CCTs within the home environment 18. First, a media presentation to be played is selected (step 600). Note that this discussion is equally applicable to the situation where the media presentation is selected for recording rather than playback such that the CCT client 60 requests CCTs prior to playback. The media presentation may be selected in various manners depending on the particular implementation of the primary playback system 52. For example, if the primary playback system 52 is a DVD player, the media presentation may be selected by inserting a DVD into the DVD player or selecting one of a number of DVDs within a multi-disc DVD player. As another example, if the primary playback system 52 is a PVR, the media presentation may be selected by selecting a recorded media presentation such as a movie or an episode of a television program.

Once the media presentation is selected, the media player 58 provides information identifying the selected media presentation to the CCT client 60 (step 602). The information may be provided in response to the user of the primary playback system 52 instructing the primary playback system 52 to obtain and play one or more CCTs concurrently with the selected media presentation. Alternatively, the CCT client 60 may automatically, or be configured to automatically, obtain the information identifying the selected media presentation from the media player 58 upon detecting the selection of the media presentation.

The CCT client 60 then queries, or sends a request, to the CCT server 24 for CCTs associated with the selected media presentation (step 604). The request includes information identifying the selected media presentation. In addition, the request may include criteria to be used in selecting or creating one or more CCTs at the CCT server 24. The criteria may include one or more desired event types, a range of dates, one or more genres, one or more user IDs, demographic information, information describing the capabilities of the CCT players 64, 70, 72, information describing the capabilities of the devices 54, 56, information describing the speed of the network connection between the primary playback system 52 and the network, and the like. This list of criteria is not intended to be exclusive. Various other criteria that may be used to customize or select CCTs at the CCT server 24 will be apparent to one of ordinary skill in the art upon reading this disclosure. Note that the information describing the capabilities of the CCT players 64, 70, 72 and devices 54, 56 and the information describing the speed of the network connection may be desirable when, for example, a particular CCT generated by the CCT server 24 has a high-bandwidth requirement or requires a high-definition display.

Once the CCT server 24 has obtained the desired CCTs from the CCT database 28 or generated the desired CCTs in response to the request, the CCTs are provided to and received by the CCT client 60 (step 606). In one embodiment, the CCT server 24 provides the CCTs to the CCT client 60. In another embodiment, the CCT server 24 provides information describing the CCTs to the CCT client 60. The user may then interact with the CCT client 60 to select one or more of the CCTs to be presented concurrently with the selected media presentation. The CCT client 60 may then download the selected CCTs from the CCT server 24. In this manner, only selected CCTs are downloaded to the CCT client 60.

The CCT client 60 then provides one or more CCTs to the CCT player 64, the CCT player 70, the CCT player 72, or any combination thereof (step 608). For example, one of the CCTs may be selected and provided to each of the CCT player 64, the CCT player 70, and the CCT player 72. As another example, different CCTs may be provided to the CCT player 64, the CCT player 70, and the CCT player 72. The CCT client 60 then synchronizes the playback of the media presentation and the CCTs and initiates playback (step 610).

In one embodiment, the CCT client 60 may additionally filter the user events within the CCTs based on predetermined or user defined criteria before providing the CCTs to the CCT players 64, 70, and 72. This may be particularly beneficial in applications such as parental control where the user desires to filter obscene or offensive content from the CCTs.

While FIG. 10 illustrates that playback of the media presentation may not begin until the CCTs have been downloaded to the CCT client 60 and provided to the CCT players 64, 70, and 72, the present invention is not limited thereto. The user may alternatively begin playback of the media presentation before the CCTs are downloaded to the CCT client 60 and provided to the CCT players 64, 70, and 72. In this case, once the CCTs are downloaded and provided to the CCT players 64, 70, and 72, the CCT players 64, 70, and 72 are synchronized with the media player 36 such that playback of the CCTs on the CCT players 64, 70, and 72 begins at a point that is aligned with playback of the media presentation. For example, when the CCTs are provided to the CCT players 64, 70, and 72, playback of the media presentation on the media player 58 may currently be at a point that is five minutes from the beginning of the media presentation. As a result, the CCT players 64, 70, and 72 begin playback of the CCTs at a point corresponding to five minutes into the playback of the media presentation.

Figure 11:
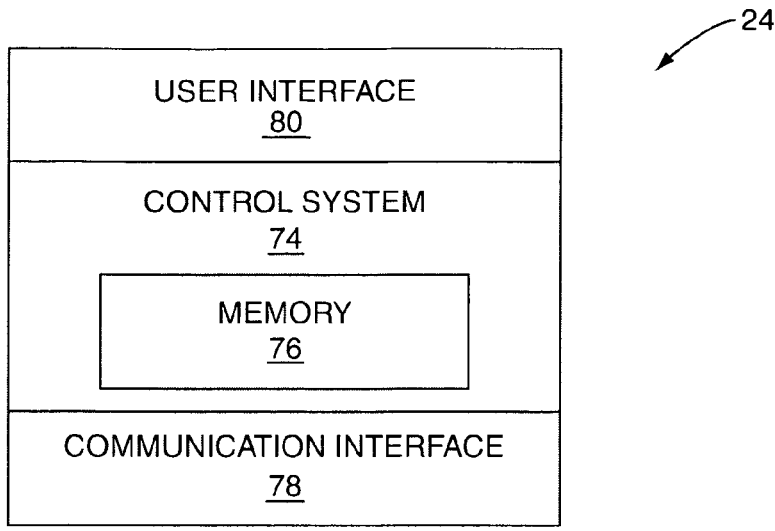
FIG. 11 is a block diagram of an exemplary embodiment of the CCT server of FIG. 1.

FIG. 11 is a block diagram of the CCT server 24 according to embodiment of the present invention. In general, the CCT server 24 includes a control system 74 having associated memory 76. The memory 76 preferably stores software instructing the CCT server 24 to operate according to the present invention. The CCT server 24 also includes a communication interface 78 communicatively coupling the CCT server 24 to the network 22 (FIG. 1). The CCT server 24 may also include a user interface 80 including components such as, but not limited to, a display, user input devices, and the like.

Figure 12:
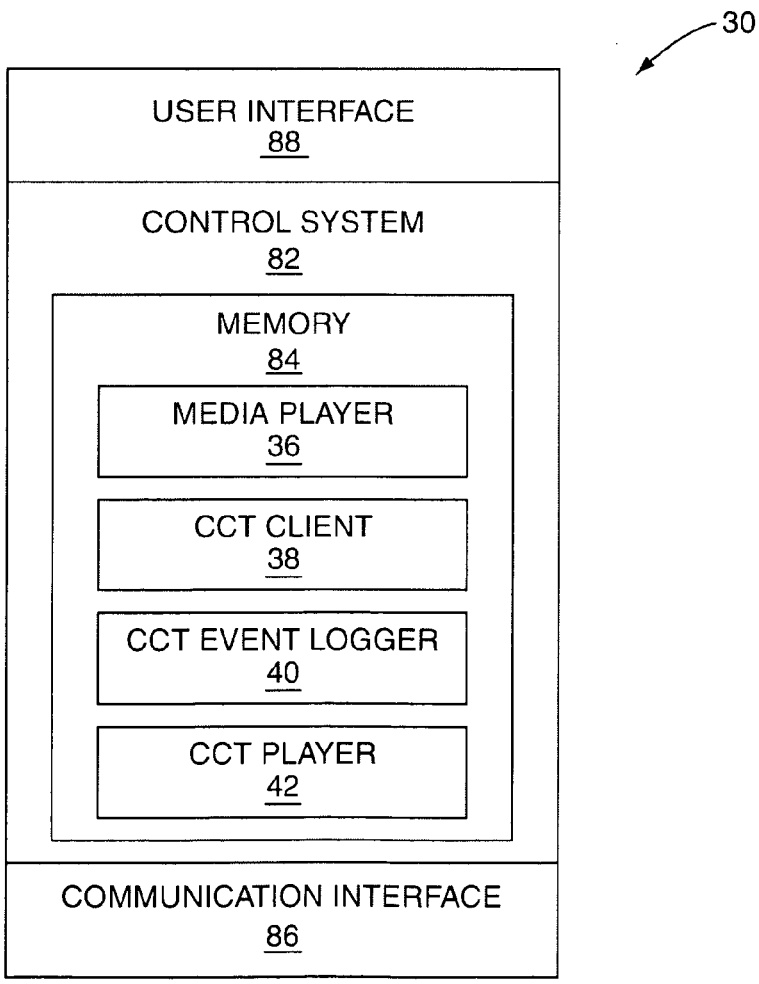
FIG. 12 is a block diagram of an exemplary embodiment of the primary playback system of FIG. 1.

FIG. 12 is a block diagram of the primary playback system 30 according to one embodiment of the present invention. It should be noted that this discussion is equally applicable to the primary playback system of the home environment 16 and the primary playback system 52 of the home environment 18. In general, the primary playback system 30 includes a control system 82 having associated memory 84. In this embodiment, the media player 36, the CCT client 38, the CCT event logger 40, and the CCT player 42 are each implemented in software and are stored in memory 84. The primary playback system 30 also includes a communication interface 86 communicatively coupling the primary playback system 30, and at least the CCT client 38, to the network 22 (FIG. 1). The primary playback system 30 also includes a user interface 88 including components such as, but not limited to, a display, a user input device, speakers, and the like.

Figure 13:
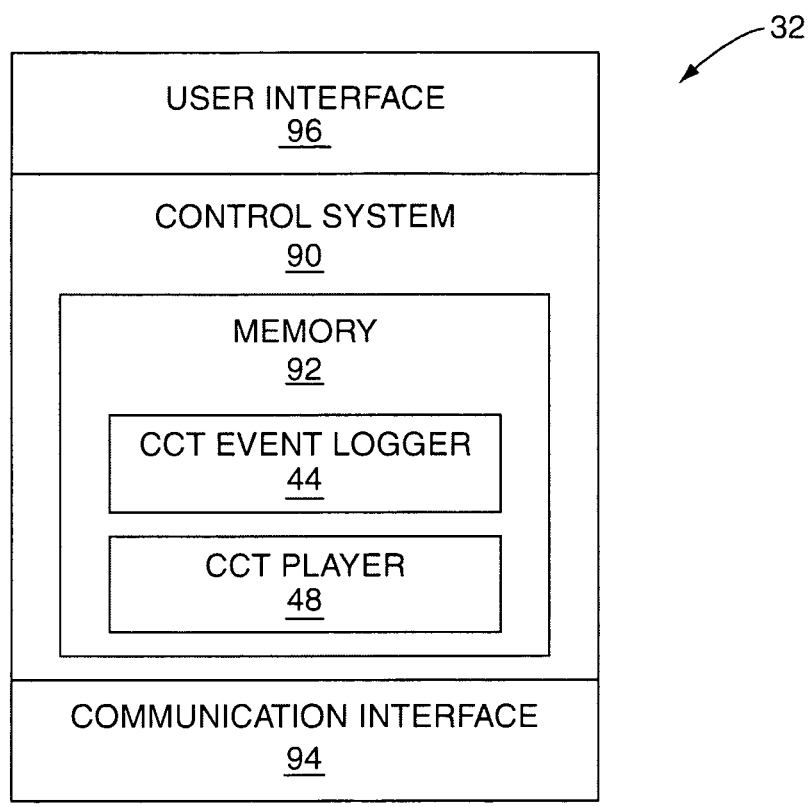
FIG. 13 is a block diagram of an exemplary embodiment of the secondary device of FIG. 1.

FIG. 13 is a block diagram of the secondary device 32 according to one embodiment of the present invention. It should be noted that this discussion is equally applicable to the secondary devices 34, 54, and 56 within the home environments 14 and 18 and the like devices within the home environment 16. In general, the secondary device 32 includes a control system 90 having associated memory 92. In this example, the CCT event logger 44 and the CCT player 48 are implemented in software and stored in the memory 92. The secondary device 32 also includes a communication interface 94 communicatively coupling the secondary device 32 to the primary playback system 30, and at least the CCT client 38. The communication interface 94 may optionally couple the secondary device 32 to the network 22 (FIG. 1). The secondary device 32 also includes a user interface 96 including components such as, but not limited to, a display, user input devices, speakers, and the like.

The present invention provides substantial opportunity for variation without departing from the spirit or scope of the present invention. For example, while primary playback systems 30 and 52 have been described as including the CCT event loggers 40 and 62 and the CCT players 42 and 64, the present invention is not limited thereto. More specifically, the primary playback systems 30 and 52 may not include the CCT event loggers 40 and 62 such that the CCT server 24 generates the CCTs based only on the user events from the secondary devices 32, 34, 54, and 56 and optionally further based on user events from the third party provider 20. Alternatively or additionally, the primary playback systems 30 and 52 may not include the CCT players 42 and 64 such that the CCTs are presented to the user only on the secondary devices 32, 34, 54, and 56.

In addition, while exemplary embodiments of CCTs are provided above, the present invention is not limited thereto. The CCTs of the present invention may be any playable media file, which may be interactive or non-interactive, wherein information is provided to a user viewing or listening to a media presentation based on user events from other users occurring while the other users were watching or listening to the same media presentation. Numerous variations in the exact manner in which the CCTs are constructed based on the user events will be apparent to one of ordinary skill in the art upon reading this disclosure.

Further, while the discussion herein focuses on obtaining the CCTs from the CCT server 24 at the central system 12, the present invention is not limited thereto. All or a portion of the CCTs generated by the CCT server 24 may be distributed to the primary playback systems 30, 52. The distribution of the CCTs may be the result of requests for CCTs from the CCT clients 38, 60, as discussed above. Thereafter, when one of the CCTs is desired, the CCT clients 38, for example, may obtain the CCT from the primary playback system 30 in a peer-to-peer fashion.

Those skilled in the art will recognize improvements and modifications to the preferred embodiments of the present invention. All such improvements and modifications are considered within the scope of the concepts disclosed herein and the claims that follow.

What is claimed is:

1. A method of generating one or more Collaborative Content Tracks (CCTs) to be presented to a user concurrently with a media presentation comprising:
    collecting from a plurality of CCT clients a plurality of user events describing actions taken by a plurality of users while being presented with the media presentation;
    generating a CCT for the media presentation based on the plurality of user events, wherein the CCT is a media track;
    receiving a request for the generated CCT after a user interacts with the media presentation; and
    providing the generated CCT to the user, wherein the generated CCT is concurrently provided to the user as the user continues interaction with the media presentation.

2. The method of claim 1 wherein collecting the plurality of user events comprises collecting the plurality of user events from a plurality of user devices associated with each of the plurality of CCT clients.

3. The method of claim 2 wherein, for each of the plurality of CCT clients, collecting the plurality of user events from the plurality of user devices comprises:
    collecting user events from a media player playing the media presentation; and
    collecting user events from at least one secondary device.

4. The method of claim 2 wherein, for each of the plurality of CCT clients, collecting the plurality of user events from the plurality of user devices comprises collecting user events from a plurality of secondary devices associated with each of the plurality of CCT clients.

5. The method of claim 1 wherein collecting the plurality of user events comprises collecting the plurality of user events from a media player associated with each of the plurality of CCT clients for playing the media presentation.

6. The method of claim 1 wherein collecting the plurality of user events comprises collecting the plurality of user events of at least one type selected from a group consisting of: web Uniform Resource Locator (URL) request events, instant message send or receive events, email send or receive events, media viewing events, and media recording events.

7. The method of claim 1 wherein each user event comprises information selected from a group consisting of: a globally unique event identifier (ID), an event type, a device ID identifying a device upon which the user event occurred, a user ID, a time stamp defining a time at which the user event occurred, a time offset defining a time offset between a beginning of the media presentation and the time at which the user event occurred, and a value defining the user event.

8. The method of claim 1 wherein generating the CCT comprises filtering the plurality of user events from the plurality of CCT clients for the media presentation to provide filtered user events and generating the CCT based on the filtered user events.

9. The method of claim 8 wherein filtering the plurality of user events comprises filtering the plurality of user events based on at least one predetermined criterion.

10. The method of claim 9 wherein generating the CCT further comprises generating the CCT prior to receiving a request for the CCT.

11. The method of claim 9 wherein the at least one predetermined criterion is selected from a group consisting of: one or more desired event types, one or more ranges of dates, one or more genres, one or more user identifiers (IDs), and demographic information.

12. The method of claim 1 further comprising receiving a request for the generated CCT for the media presentation from a requesting node, wherein generating the CCT comprises:
    filtering the plurality of user events from the plurality of CCT clients based on at least one criterion included within the request to provide filtered user events; and
    generating the CCT based on the filtered user events.

13. The method of claim 12 wherein the request is generated by a user associated with the requesting node.

14. The method of claim 12 wherein the request is automatically generated by the requesting node.

15. The method of claim 12 wherein the at least one criterion is selected from a group consisting of: one or more desired event types, one or more ranges of dates, one or more genres, one or more user identifiers (IDs), and demographic information.

16. The method of claim 1 further comprising obtaining user events from a third party provider, wherein generating the CCT comprises generating the CCT based on the plurality of user events from the plurality of CCT clients and the user events from the third party provider.

17. The method of claim 1 further comprising obtaining an additional CCT from a third party provider, wherein at least one of the CCT and the additional CCT is subsequently presented to a user concurrently with the media presentation.

18. The method of claim 1 further comprising:
    receiving feedback regarding the plurality of user events; and
    prioritizing the plurality of user events based on the feedback to provide prioritized user events;
    wherein generating the CCT comprises generating the CCT based on the prioritized user events.

19. The method of claim 1 further comprising receiving feedback regarding the generated CCT and assigning a user rating to the generated CCT based on the feedback.

20. The method of claim 1 wherein generating the CCT comprises:
    identifying a number of time slices of the media presentation;
    associating the plurality of user events with corresponding ones of the number of time slices based on a time at which the plurality of user events occurred with respect to a beginning of the media presentation;
    adjusting a duration of the plurality of user events such that at least one of the plurality of user events is associated with each of the number of time slices to provide dispersed user events; and
    generating the CCT based on the dispersed user events.

21. The method of claim 1 wherein generating the CCT comprises generating the CCT such that the generated CCT includes at least one interactive reference to external content.

22. The method of claim 1 further comprising receiving a request for the generated CCT for the media presentation when the user records the media presentation, wherein generating the CCT comprises generating the CCT for the media presentation in response to receiving the request.

23. The method of claim 1 further comprising presenting the generated CCT to the user concurrently with the media presentation.

24. The method of claim 1 further comprising presenting the generated CCT to the user concurrently with the media presentation via a secondary device separate and apart from a primary playback system playing the media presentation.

25. The method of claim 1 further comprising generating a plurality of CCTs for the media presentation including the generated CCT based on the plurality of user events.

26. The method of claim 25 further comprising presenting at least two of the plurality of CCTs to the user concurrently with the media presentation.

27. The method of claim 1 further comprising:
    filtering the generated CCT based on at least one criterion, thereby removing contents from the generated CCT corresponding to ones of the plurality of user events satisfying the at least one criterion to provide a filtered CCT; and
    presenting the filtered CCT to the user concurrently with the media presentation.

28. The method of claim 1 wherein the user is separate from the plurality of users.

29. A system comprising:
    a plurality of Collaborative Content Track (CCT) clients adapted to provide a plurality of user events that occurred while playing a media presentation; and
    a CCT hardware server adapted to:
        collect from the plurality of CCT clients the plurality of user events from the plurality of CCT clients describing actions taken by a plurality of users while being presented with the media presentation;
        generate a CCT for the media presentation based on the plurality of user events, wherein the CCT is a media track;
        receive a request for the generated CCT after a user interacts with the media presentation; and
        provide the generated CCT to the user, wherein the generated CCT is concurrently provided to the user as the user continues interaction with the media presentation.

30. A method of generating one or more Collaborative Content Tracks (CCTs) to be presented to a user concurrently with a media presentation comprising:
    delaying a live media presentation to provide a delayed media presentation;
    collecting from a plurality of CCT clients a plurality of user events from the plurality of CCT clients describing actions taken by a plurality of users while being presented with the live media presentation;
    filtering the plurality of user events;
    generating time slices of a CCT for the media presentation based on the filtered user events, wherein the CCT is a playable media track; and
    providing the time slices of the CCT to the user, wherein the CCT is concurrently provided to the user as the user interacts with the media presentation.

* * * * *